United States Patent
Moffat

(10) Patent No.: US 10,130,075 B2
(45) Date of Patent: Nov. 20, 2018

(54) CLAMSHELL SENSORY HEADGEAR FOR A PET

(71) Applicant: Scott C. Moffat, Kittery, ME (US)

(72) Inventor: Scott C. Moffat, Kittery, ME (US)

(*) Notice: Subject to any disclaimer, the term of this patent is extended or adjusted under 35 U.S.C. 154(b) by 0 days.

(21) Appl. No.: 15/422,864

(22) Filed: Feb. 2, 2017

(65) Prior Publication Data
US 2017/0215383 A1    Aug. 3, 2017

Related U.S. Application Data

(60) Provisional application No. 62/290,226, filed on Feb. 2, 2016.

(51) Int. Cl.
| | |
|---|---|
| *A01K 15/04* | (2006.01) |
| *A01K 25/00* | (2006.01) |
| *A01K 13/00* | (2006.01) |
| *A01K 15/02* | (2006.01) |

(52) U.S. Cl.
CPC ............ *A01K 25/00* (2013.01); *A01K 13/006* (2013.01); *A01K 15/02* (2013.01)

(58) Field of Classification Search
CPC . A01K 25/00; A01K 13/006; A61D 2003/003
USPC ....... 119/814, 850, 815, 821, 837, 831, 832, 119/823, 729, 762, 827
See application file for complete search history.

(56) References Cited

U.S. PATENT DOCUMENTS

| | | | | |
|---|---|---|---|---|
| 2,897,780 A | * | 8/1959 | Ayres ................... | A01K 13/006 119/837 |
| 3,126,869 A | * | 3/1964 | Young et al. .......... | A01K 15/02 119/65 |
| 4,581,877 A | * | 4/1986 | Wilber ..................... | A61D 9/00 128/858 |
| 5,345,751 A | * | 9/1994 | Edwards .............. | A01K 13/006 54/80.2 |
| 6,082,309 A | * | 7/2000 | Wexler ................... | A01K 25/00 119/837 |

(Continued)

FOREIGN PATENT DOCUMENTS

EP    2462802 A1    6/2012

OTHER PUBLICATIONS

Textile Apex, "What is net fabric? Types and uses of net fabric", textileapex.blogspot.com, published on Oct. 14, 2015, retrieved Mar. 29, 2017,Web Article.

(Continued)

*Primary Examiner* — Trinh T Nguyen
(74) *Attorney, Agent, or Firm* — MacMillan, Sobanski & Todd, LLC

(57) ABSTRACT

A pet headgear comprises two halves operable in "clamshell" fashion to surround the head, nose and mouth of a pet, to facilitate handling of the pet in familiar or especially unfamiliar environments, such as veterinary offices, groomers, kennels or during transporting. The clamshell hinges at one end, preferably a caudal end, so it may be applied from behind the pet and the two halves biased medially to close the shell about the pet's head, prior to latching the halves closed. Openings may be provided for access to the pet's ears, nose, teeth, and/or mouth. A pleasant sensory zone (PSZ) or module may be added to quiet and appease the pet and habituate them to the headgear through positive reinforcement.

14 Claims, 7 Drawing Sheets

(56) References Cited

U.S. PATENT DOCUMENTS

| | | | |
|---|---|---|---|
| 6,227,148 B1 * | 5/2001 | Wexler | A01K 25/00 |
| | | | 119/837 |
| 6,244,222 B1 | 6/2001 | Bowen | |
| 6,925,966 B1 | 8/2005 | Wexler | |
| 7,523,720 B1 * | 4/2009 | Lecy | A01K 13/006 |
| | | | 119/821 |
| 7,753,007 B1 | 7/2010 | Anderson | |
| 8,286,593 B2 | 10/2012 | Albers | |
| 8,833,311 B2 * | 9/2014 | Kostelec | A01K 13/006 |
| | | | 119/850 |
| 9,155,602 B1 * | 10/2015 | Cogley | A01K 25/00 |
| 9,277,732 B1 * | 3/2016 | Chrostowski | A01K 13/006 |
| 9,820,470 B1 * | 11/2017 | Hufstedler | A01K 25/00 |
| 2001/0009143 A1 * | 7/2001 | Wexler | A01K 25/00 |
| | | | 119/837 |
| 2007/0062462 A1 | 3/2007 | McGuire | |
| 2010/0043725 A1 * | 2/2010 | Hall | A01K 13/006 |
| | | | 119/850 |
| 2013/0014705 A1 | 1/2013 | Cho et al. | |
| 2013/0152875 A1 | 6/2013 | Levine | |

OTHER PUBLICATIONS

PCT International Search Report and the Written Opinion, Application No. PCT/US2017/016135, dated Apr. 21, 2017.

"Four Flags Cat Muzzle", Muzzles Commercially Available through Google Shopping, date accessed uncertain.

"Grreat Choice Muzzle", Muzzles Commercially Available through Google Shopping, date accessed uncertain.

"Guardian Gear Cat Muzzle", Muzzles Commercially Available through Google Shopping, date accessed uncertain.

"Petco Baskerville Muzzle", Muzzles Commercially Available through Google Shopping, date accessed uncertain.

"Petco Nylon Muzzle", Muzzles Commercially Available through Google Shopping, date accessed uncertain.

"Soft Paws Air Muzzle", Muzzles Commercially Available through Google Shopping, date accessed uncertain.

* cited by examiner

CLAMSHELL SENSORY HEADGEAR FOR A PET

This applications claims priority to U.S. provisional application No. 62/290,226 filed Feb. 2, 2016, which is incorporated herein in its entirety.

BACKGROUND OF THE INVENTION

The present invention relates generally to pet-handling accessory items and, in particular, to a headgear for pets that includes a sensory module that aids in acclimating the pet to the continued or repeated use of the headgear.

Throughout the course of a pet's life there are many instances where restraint must be used to achieve a desired result, such as pet care or transportation. The restraint may be necessary to protect the caregiver, the owner or even the general public. A routine visit to a care giver, such as a veterinarian or a groomer, may also result in a situation where the caregiver needs access to eyes, ears, nose, mouth, teeth, etc. of the animal for proper care giving. In this respect, many existing muzzles and restraints are unsuitable or at least lacking me meeting all the criteria. Similarly, transporting a pet, whether by bus, car, train, air, or boat, and whether to a local kennel, the caregiver, or even to a private household, may require a restraint for the safety of all nearby. "Pets" specifically refers to a domesticated or tamed animal kept for companionship or pleasure and treated with care and affection. Dogs and cats are the most common, but certainly not the only, types of "pets" amenable to this invention.

For cats, there are only a couple different options for restraint. The first is a quick slip-on muzzle that covers the eyes and attaches behind the head of the cat. This design is often hard to size, easy for the cat to remove, and very difficult to attach as it is applied from the front where the cat can physically fight back. This often leads to mishandling and can cause injury and potential health problems for the handler and the pet. The other design is a heavy plastic ball that is put over the animals' entire head and covers all access points. It has proven to be impractical in professional settings for certain treatment modalities and for smaller animals, and is somewhat pricy for the average pet-owner.

For dogs, there are more styles and variations on the market but they all tend to have the similar issues. The dogs who don't want the muzzle to remain on can often slip out of it, they are all applied from the front where the animal can see it and fight back. They tend to be difficult to size, often produce discomfort, and durability is often cited as an issue.

A number of muzzles exist and are commercially available. For example, the following table identifies a number of known muzzles.

| Product | Features | Strengths | Weaknesses | Sources |
| --- | --- | --- | --- | --- |
| Guardian Gear | Fully adjustable strap<br>Made from strong nylon fabric<br>Quick release buckle | Stops cats from biting and chewing<br>Lined with chafe-free inner seams for added comfort | Attaches from front<br>Difficult to secure Velcro ™ straps<br>Cat can remove<br>Blinds the cat causing stress | Online |
| Four Flags Quick Muzzle | Water and dirt resistant nylon cloth<br>Quick closure hook-and-loop tab | Very durable<br>Form fitting, making it difficult for cats to remove | Attaches from front<br>Covers the eyes which can cause fright/stress | Four Flags Over Aspen Online |
| Soft Paws Air Muzzle | Unique design allows for easy attachment<br>Open front<br>Adjustable joint for proper fit | Allows animal to see, reducing stress<br>Optional attachable oxygen mask<br>Adjustable joint provides a secure fit every time | Attaches from front<br>Too heavy for smaller animals<br>Impractical for long term use | Soft Paws Online |
| Co. of Animals Baskerville | Ergonomically designed strapping<br>Soft neoprene padding<br>Quick and easy fit | Maximizes safety for owner<br>Tough and durable<br>Comfortable for a pet<br>Allows to drink and pant | Easily removed by animal<br>Sizing is difficult for consumers<br>Cumbersome on/off<br>Basket size too small | PETCO Online |
| Great Choice | Breathable mesh material<br>Safe and humane<br>Padded in contact areas | Comfortable<br>Prevents biting, chewing and barking without catching hair | Difficult sizing<br>Attaches from front<br>Easily removed<br>Not easily adjusted | PetSmart Online |
| Petco Nylon and Mesh | Quick fitting<br>Strong, breathable nylon<br>Flexible | Allows for drinking, panting and treat feeding<br>Soft and comfortable | Difficult to size<br>Very easily removed<br>Only viable for small dogs<br>Attaches from front | PETCO Online |
| Veterinary Solutions | Fits a wide variety of dogs and cats<br>Utilizes minimal restraint | Comfortable for animal<br>Hard to remove | Very difficult to attach<br>Attaches from front<br>Hard to size | Online |

However, available muzzles suffer from one or more drawbacks, such as blocking of vision of the animal, discomfort of fit, inability to eat or drink, difficulty in breathing or panting, and difficulty in putting the muzzle on the pet.

Also known are restraints such as the encapsulating sphere with sleeve collar as taught in U.S. Pat. Nos. 6,082,309 and 6,227,148, both to Wexler. These are ball-like or globular devices that include a polar opening for insertion of the pet's head and a sleeve or collar extending along the neck of the animal. Among the problems of existing muzzles and restraints is the need to approach the animal anteriorly (from the front) in order to equip the pet with the restraint.

Almost universally, the pet prefers not to be so-restrained, so the use of muzzle restraint can be a source of anxiety to the pet. Consequently, pets often come to associate the muzzle with "bad" events (e.g. strange smells, strange sounds, and strange sensations and manipulations); and over time the pet may come to resist the use of it. This learned resistance further complicates the use of muzzles since, at first sight the pet may hiss, snarl, growl, bite, scratch or otherwise express its displeasure with the notion of wearing the muzzle. Pet bites account for a number of significant injuries to pet handlers. In a survey, 67% of respondents indicated receiving a bite or scratch from a cat, and 48% had suffered a dog bite. The New England Journal of Medicine reports that between 28% and 80% of bites and scratches develop in to infections. Some estimates indicate that about 30% of hand bite injuries require some hospitalization (J. Hand Surgery).

It would therefore be advantageous if improved headgear existed that would address these drawbacks.

SUMMARY OF THE INVENTION

The invention relates generally to a muzzle or headgear for an animal. In general, the headgear comprises:

a pair of half clamshell portions each having periphery complementary to the other, and a cup-like concavity adapted collectively to fit about the head of an animal, the periphery defining a rostral end and a caudal end relative to the animal, the pair of half portions being connected at least one point along the periphery of the clamshell portions to form a flexible hinge joint; and a fastener mechanism positioned at the periphery opposite the flexible hinge joint and adapted for securing the clamshell portions together.

In some embodiments of the headgear, the flexible hinge joint is located at the caudal end and the fastener is located at the rostral end to enable fitting the headgear to the animal from a posterior direction. In some embodiments of the invention the clamshell portions are sized and shaped to fit closely about the head of the animal. In such embodiments, each clamshell portion may define an opening through which the ears of the animal may protrude and, optionally, an opening through which the eyes may see. The headgear may also include padding on the inside of the concavity for comfort during longer instances or even continuous wearing.

In some embodiments, the clamshell portion comprises a solid, transparent material. In other embodiments, the clamshell portion comprises bands or straps that define a loose mesh material.

In some embodiments, the headgear further comprises a pleasant sensory zone disposed in the headgear to deliver a pleasant stimulus to the animal while wearing the headgear. A pleasant sensory zone (PSZ) is an area that incorporates a feature that gives a pleasant stimulation of one or more of the senses of the pet while the pet wears the head gear. Such stimulus may be, for example, audible and placed hear the ear; olfactory and placed near the nose; or an edible "treat" made accessible near the mouth; or a combination of any of these. For example, the pleasant sensory zone may be loaded with a stimulus selected from a pheromone, a flavoring agent, and a pet treat. These PSZ's are described in more detail below.

In another aspect, the invention includes a method for using the headgear. The method comprises:

approaching the animal from the rear with the clamshell portions of the headgear separated or opened;

closing the clamshell portions together about the head of the animal from behind with the caudal end of the periphery at the animal's neck and the rostral end at the animal's mouth and nose; and securing the fastener mechanism at the rostral end.

The method may further include delivering a pleasant sensory stimulus to calm the animal. The methods may be used from many purposes, including travel, veterinary examination and medical or grooming procedures. In particular embodiments, the method may be used to habituate an animal to a potentially stressful environment through positive reinforcement; and/or protecting a wounded animal from aggravating the wound, a bandage or a cast in the area of the wound.

The unique design and construction of the headgear allows for risk-free handling of companion animals in any setting, allowing for more frequent vet visits, easier grooming trips, and an overall better relationship between pets, owners, and professionals. The headgear is constructed out of a pliable yet rigid material and may be mesh or see through allowing the animal to have full eyesight and the ability to drink or receive treats. This design stands out from any other muzzle on the market because it is applied from behind the animal, so before they have a chance to fight back they are already inside of the muzzle and can cause no harm to themselves or the handler. Along with this innovative way to approach the animal, there are a host of additional unique features that the "clamshell" headgear may provide.

Another key feature of some embodiments of present invention is inclusion of a hinge portion in the caudal or dorsal area of the head gear. This allows the pet to be approached posteriorly (from behind) which is generally a safer route. The caudal/dorsal hinge portion joins the clamshell portions at the neck, allowing the clamshell halves to be swung medially to join and latch in the rostral/ventral area.

Another key feature is that the comfortable nature of the headgear allows it to be wearable 24 hours a day, 7 days a week, except possibly for times of solid food intake. The animal is generally able to drink using a suitable mouth opening.

Another key feature is a method for handlers to treat the animal without risk of bite or aggression. Accordingly, this method comprises:

fitting an animal with the headgear as described herein, closing and securing the clamshell portions together about the head of the animal; and treating the animal, wherein treating in the animal further comprises a treatment selected from dental treatment such as tooth or gum cleaning, oral surgery, etc., medication treatment such as the oral administration of antibiotics, antiworm medications, vitamins or other medicines, hygiene treatment, feeding treatment, surgical treatment, ophthalmic treatment, or training treatment.

BRIEF DESCRIPTION OF THE DRAWINGS

The accompanying drawings, incorporated herein and forming a part of the specification, illustrate the present invention in its several aspects and, together with the description, serve to explain the principles of the invention. In the drawings, the thickness of the lines, layers, and regions may be exaggerated for clarity.

Various aspects of this invention will become apparent to those skilled in the art from the following detailed description of the preferred embodiment, when read in light of the accompanying drawings.

DETAILED DESCRIPTION

The terms, "muzzle", "headgear" and "helmet" may all be used interchangeably to describe this invention. The term "clamshell" halves or portions, refers to a pair of complementary shapes, each generally defining a concavity and having a periphery that is complementary to the other "clamshell" half or portion. "Complementary" in this regard includes a straight or planar periphery as well and one marked by alignment or indexing features such as teeth or pins and receiving sockets or other detentes that are used to ensure proper alignment of the clamshell halves when closed. The need for these depends in part on the rigidity of the hinge. Although the surface of a marine clamshell may be continuous, surface continuity is not required of the headgear disclosed herein. The shape surfaces may be continuous except for suitable holes or orifices defined therein as explained herein; or they may be discontinuous, such as one made of strips of material to form a loose mesh-like structure.

"Pets" refers generally to a domesticated or tamed animal kept for companionship or pleasure and treated with care and affection. Dogs and cats are the most common, but certainly not the only, types of "pets" amenable to this invention. Primates, pigs, goats, sheep, birds, lemurs, ferrets and other types of animals have also been reported as pets, and this list is still not exhaustive. Although the description may refer to the more typical pets, it will be understood that the invention is broadly applicable to any animal, domesticated or not, that has a head and mouth.

"Handlers" refers to anyone who is responsible for moving, transporting, or manipulating the pet in any way. This explicitly includes owners and family members of owners; caregivers such as veterinarians, veterinary dentists, groomers, trainers, instructors, kennel operators, zoo personnel, etc.; and implicitly includes any other party meeting the general definition.

Figure 3:
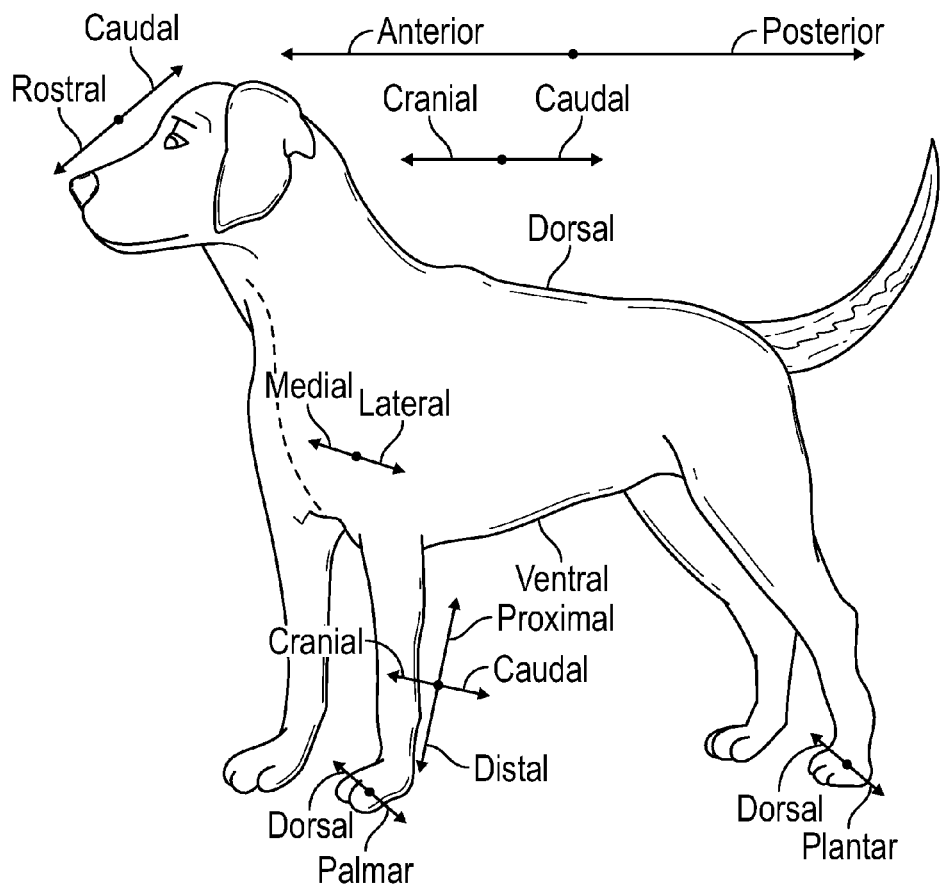
FIG. 3 illustrates a pet and the anatomical directional terminology for pets, some of which is used in describing this invention.

Referring to FIG. 3, the head or nose of an animal is referred to anatomically as the anterior end and the tail is referred to as the posterior (sometimes caudal) end. In organisms, that have distinct heads (such as cats, dogs, birds, primates, and most other vertebrates) the anterior end is sometimes referred to as the rostral or cranial end. While "anterior"/"posterior" has broader applicability for all animals, applicant prefers rostral (for nose or beak) and caudal (tail) as directional terms. This is consistent with Nomina Anatomica Veterinaria, and with common usage in veterinary medicine. Moreover, given that the invention relates to headgear, cranial might be confusing. Of course, dorsal/ventral, medial/lateral, proximate/distal and other anatomical terms may also be used in the description.

Unless defined otherwise, all technical and scientific terms used herein have the same meaning as commonly understood by one of ordinary skill in the art to which the invention belongs. Although any methods and materials similar or equivalent to those described herein can be used in the practice or testing of the present invention, the preferred methods and materials are described herein. All references cited herein, including books, journal articles, published U.S. or foreign patent applications, issued U.S. or foreign patents, and any other references, are each incorporated by reference in their entireties, including all data, tables, figures, and text presented in the cited references.

Numerical ranges, measurements and parameters used to characterize the invention—for example, angular degrees, quantities of ingredients, polymer molecular weights, reaction conditions (pH, temperatures, charge levels, etc.), physical dimensions and so forth—are necessarily approximations; and, while reported as precisely as possible, they inherently contain imprecision derived from their respective measurements. Consequently, all numbers expressing ranges of magnitudes as used in the specification and claims are to be understood as being modified in all instances by the term "about." All numerical ranges are understood to include all possible incremental sub-ranges within the outer boundaries of the range. Thus, a range of 30 to 90 units discloses, for example, 35 to 50 units, 45 to 85 units, and 40 to 80 units, etc. Unless otherwise defined, percentages are wt/wt %.

Clamshell Headgear

Figure 1A:
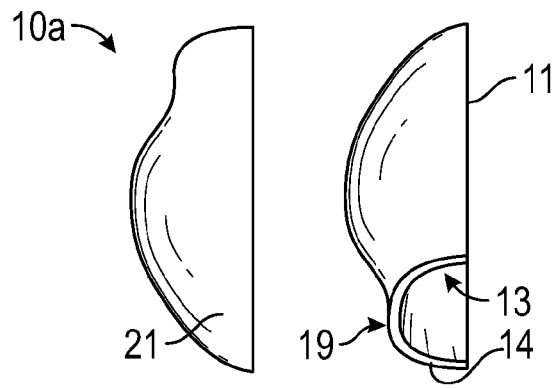
FIGS. 1A, 1B, and 1C, illustrate one half clamshell portion of a first, solid embodiment in plan views (top and bottom); front and rear elevation views; and right and left side elevation views, respectively.
Figure 1B:
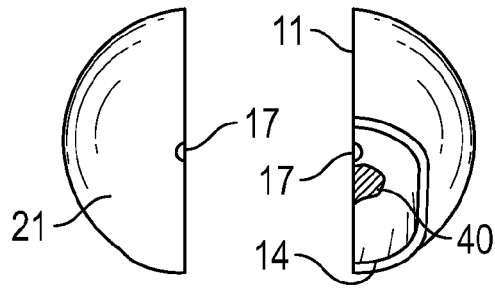
Figure 1C:
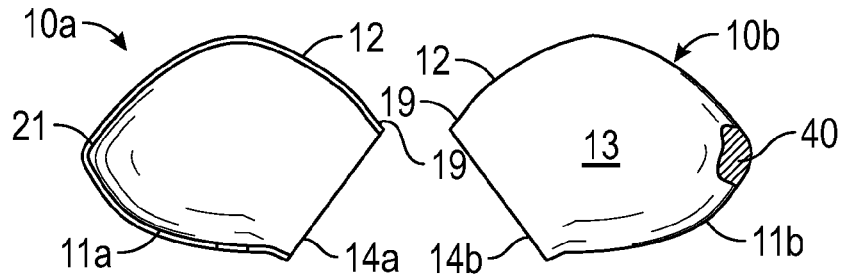
Figure 1D:
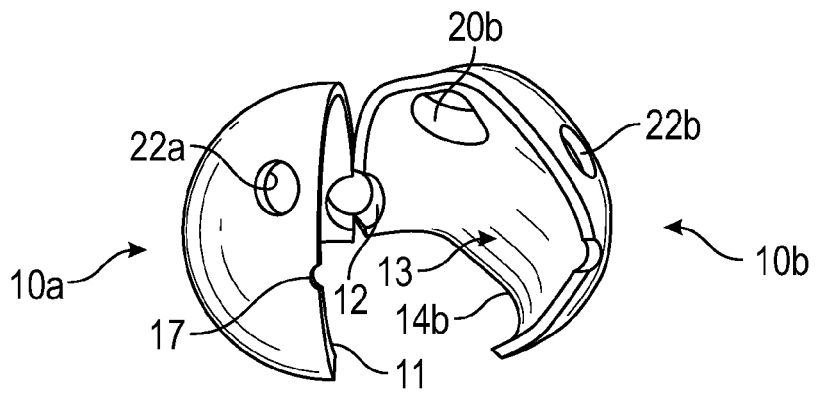
FIG. 1D illustrates the two clamshell halves of the embodiment of FIGS. 1A, 1B, and 1C in a perspective view.

Referring first to FIGS. 1A-1C and FIG. 4, one embodiment of the headgear 10 is illustrated showing the "clamshell" nature of the head gear 10, having two portions 10a and 10b, joined at a hinge area 12. Throughout this description a reference numeral, (e.g. 6) may have a suffix "a" (e.g. 6a) for a right-side part, and a suffix "b" (e.g. 6b) for a corresponding or complementary left-side part, relative to the animal. FIG. 1A shows only the right half portion 10a in top and bottom views; while FIG. 1B shows only the right half portion 10a in rostral (front) and caudal (rear) views. Each of the half portions 10a and 10b define a periphery 11a,11b that is complementary to periphery of the other side, and are cup-like or arcuate defining a cavity 13 for enclosing a spherical-like head. At a caudal area 19 of the periphery 11 (near the hinge area 12 in this embodiment), each of the half portions 10a and 10b also define semicircular recesses 14a and 14b that together form a generally circular opening to accommodate the neck of the animal. At the apex of a rostral end 21, there may be one or more openings 17 to admit air and or light to the interior cavity 13. The embodiment of the headgear 10 illustrated in FIGS. 1A to 1C may be solid, but preferably transparent.

Figure 1E:
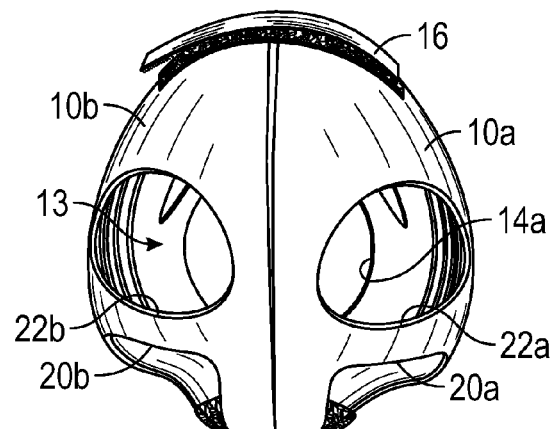
FIGS. 1E, 1F, and 1G illustrate an alternate solid embodiment showing both clamshell halves in top closed view, top open view, and open inside views, respectively.
Figure 1F:
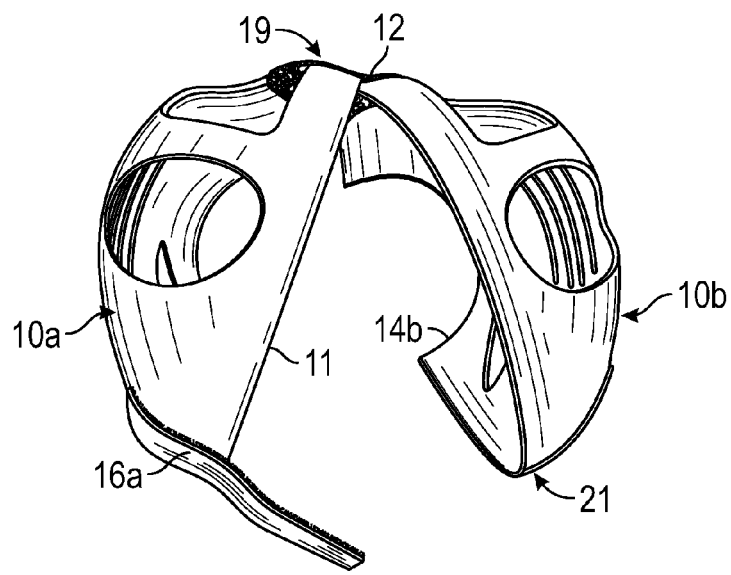
Figure 1G:
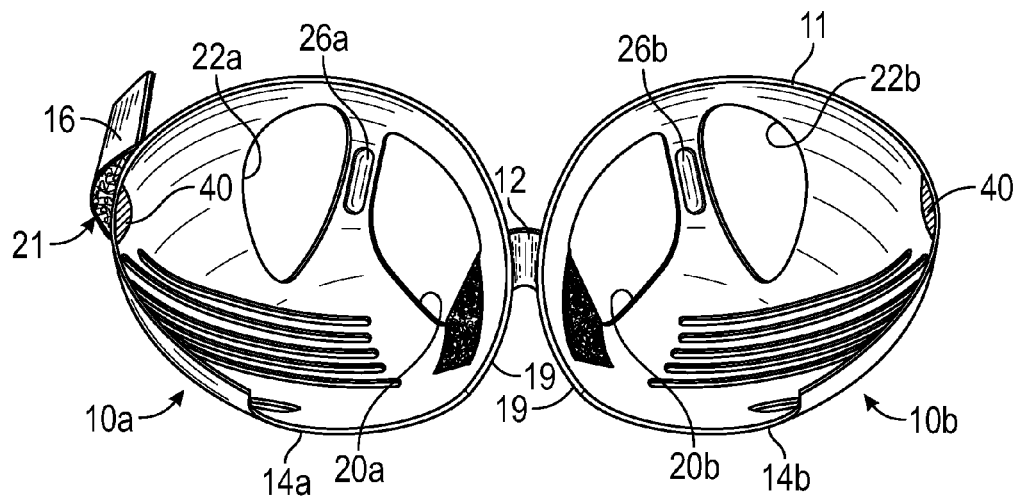
Figure 4:
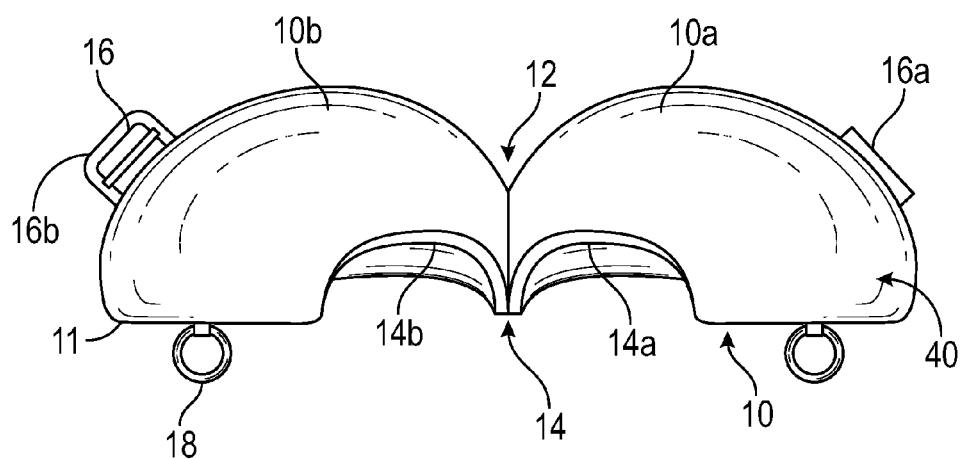
FIG. 4 illustrates another embodiment of the clamshell headgear.

Near the rostral end 21 of the clamshell headgear 10 is a fastening mechanism such as latch 16, which typically comprises a first portion 16a on half 10a, and a complementary portion 16b located on half 10b. The fastening mechanism may comprise one or more latches that hold the headgear closed securely about the head. Generally at least one latch is in a rostral area opposing the hinge area. As shown in FIGS. 1E to 1G in particular, the latch 16 is generally opposite from the hinge 12. Alternative locations for fastening mechanisms that may still oppose the hinge area include the ventral neck area below the jaw and/or forehead area near the eyes. Other fastening mechanisms are described below. A pleasant sensory zone (PSZ) 40 may optionally be incorporated at or near the rostral end 21 of the headgear 10. These also are described below. Also shown in this embodiment in FIG. 4 is a ring 18 or other attachment point for a leash. The ring 18 may appear on one or both halves 10a, 10b of the clamshell headgear 10.

Figure 5A:
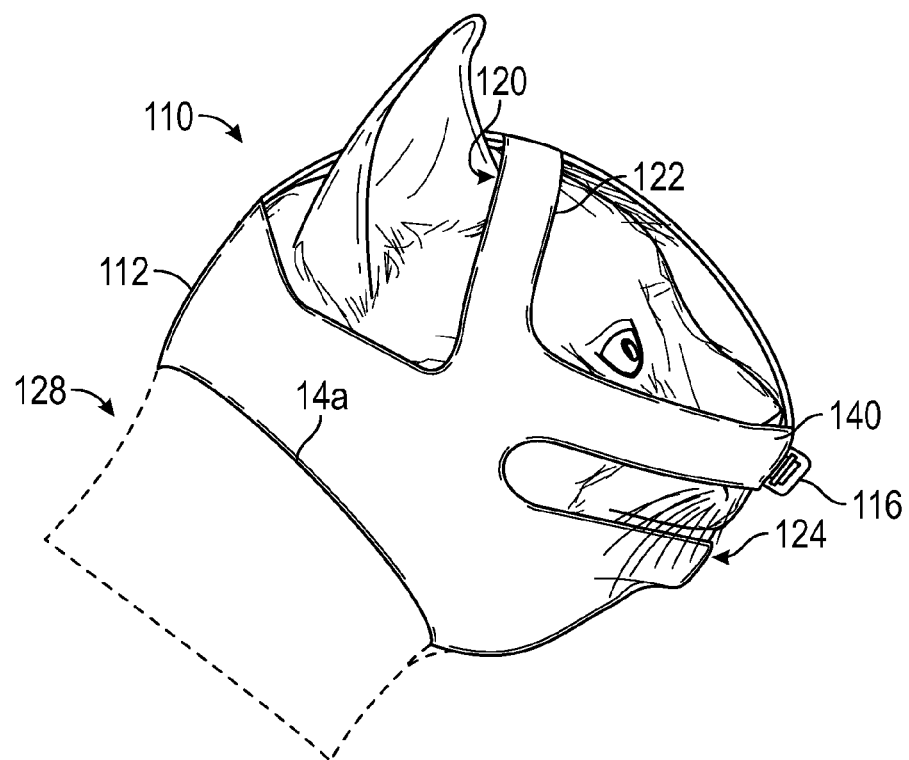
FIGS. 5A and 5B illustrate different embodiments of the clamshell headgear, showing some features adapted for a cat.

Referring now to FIGS. 1D to 1G, an embodiment is illustrated wherein the device may be solid and not transparent, but includes orifices 20a,20b for ears, orifices 22a, 22b for eyes, and orifice 17 or slots 24a,24b for mouth/nose or other ventilation. In this way the pet can see externally. In other variations, the slots may also be replaced with a single extended opening (as shown in FIG. 5A) so that the handler can better see into the pet's mouth. The ear orifices 20 also permit the headgear 10 to be smaller and lighter and fit closely to the head of the animal for a more secure, tighter fit. Especially in closely-fitted headgear, it may be desirable to provide cushioning or padding 26a, 26b in areas of the device that might rub on parts of the animal's head, causing irritation. Headgear that closely fits the head will have skull-following contours either molded into the device or as a result of selective padding in the interior of the headgear.

Figure 2A:
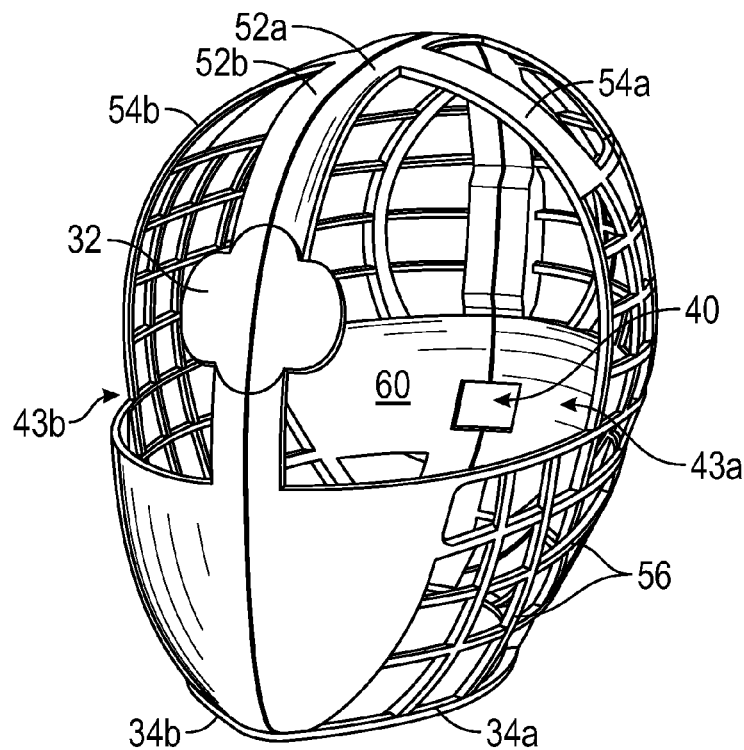
FIGS. 2A, 2B, and 2C illustrate a different mesh embodiment showing both clamshell halves in a top-caudal perspective view, a top-lateral perspective view, and a rostral-lateral perspective view, respectively.
Figure 2B:
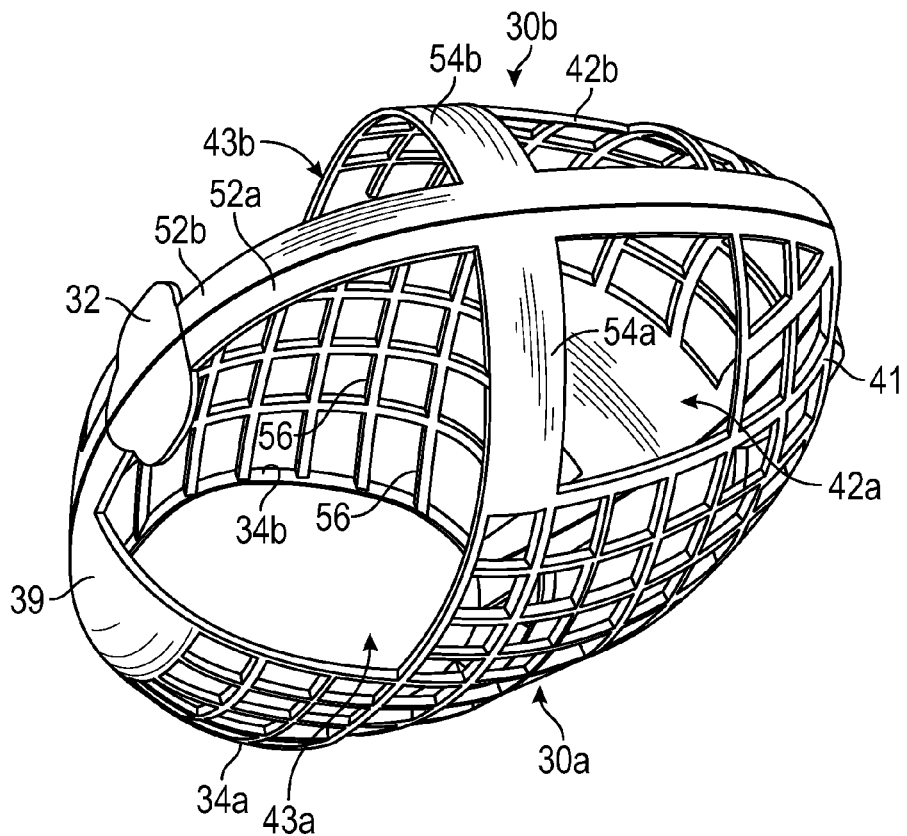
Figure 2C:
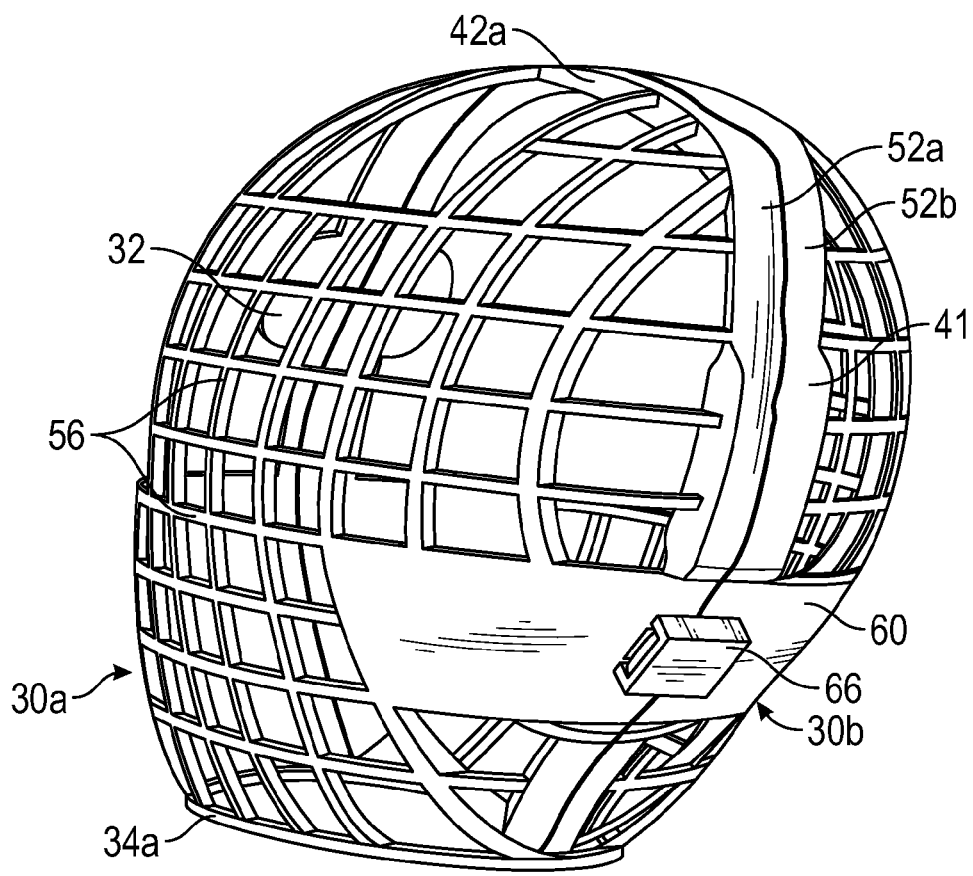
Figure 2D:
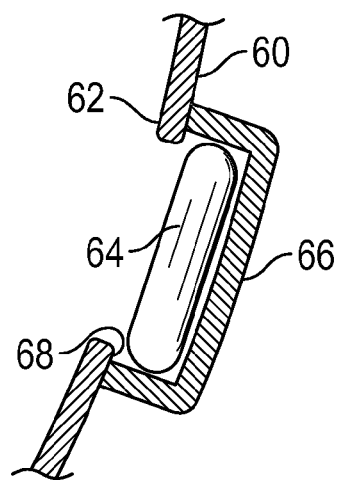
FIG. 2D is an enlarged cross-sectional view of an area near the rostral end for illustrating one embodiment of a PSZ.

A second embodiment is illustrated in FIGS. 2A to 2C. In this embodiment, the headgear 30 is composed of two halves 30a, 30b fabricated as a loose mesh material of crisscrossing bands that also allow for visibility and breathing. Higher strength, thicker sagittal bands 52a and 52b form the periphery of each clamshell half along a mid-sagittal plane. Similar wider or reinforced coronal bands 52a, and 54b may be used in a coronal plane to provide a more rigid clamshell shape. The remainder of the headgear 30 is formed of either solid material like front wall 60, or the intermediate bands 56 that form a loose mesh or a combination of these. The headgear 30 includes a hinge area 32, typically at a caudal end 39 opposing the rostral end 41, and semicircular recesses 34a, 34b that form the neck opening. In some embodiments, headgear 30 may include fenestrations, openings, or orifices 41a, 41b for ears, orifices 42a, 42b for eyes, and orifices for mouth as well (not shown in FIGS. 2A-2C). However, unless otherwise indicated, both the solid headgear 10 and the mesh or open headgear 30 may have similar features and advantages and will be described together.

The clamshell half portions may be sized in various dimensions to define a cavity 13 and orifices that accommodate the varied nose size and head shapes of pets of different genus, species, or breeds. For example a large size cup is required to encase breeds such as Great Danes, Newfoundlands or St. Bernards; while much smaller cup portions are required for smaller breeds such as Chihuahuas, Shih-Tzus, and many 'miniature' breeds. A special version may be devised for Pugs, as they have almost no rostral protrusion. Similarly, cats and pets of other species will require headgear halves proportioned for their respective noses. FIGS. 5-6 further illustrate embodiments for different species.

Referring to FIGS. 1, 2 and 4, the clamshell headgear comprises two half-shell portions that are hinged or fastened together. The hinge area 32 may be reinforced with thicker or wider sections as best shown in FIGS. 2A and 2B. The hinge may comprise a "living" hinge as is well known in the injection molding arts, and the halves can easily be molded as one unit. Alternatively the hinge may be fabric, as shown in FIG. 1G, or other material.

In some embodiments, the hinge may be located rostrally. These embodiments are generally positioned on the pet's head from and anterior perspective. Embodiments that have a hinge along a top or superior aspect of the head gear are generally put on from a superior approach; embodiments that have a hinge along a lower or inferior aspect of the head gear are generally put on from below, using an inferior approach; and embodiments that have a hinge along a lateral aspect of the head gear would be put on using a right or left lateral approach. In a more preferred variation, the hinge is located at a caudal part of the headgear, allowing an approach posteriorly. As noted, this is advantageous in that the pet will not see the device approaching and will not enter the anxiety and resistance modes so quickly.

At the aspect of the clamshell headgear opposing the hinge is a fastener or latch mechanism. The fastener or latch may comprise any type of device suited for securing the two clamshell halves together about the pet's head. Illustrative types of fasteners include buckles (e.g. quick release, side release, and conventional), snaps, hook-and-loop fasteners (such as Velcro™ brand), resilient clips or tabs with detents that may insert under opposing clips, tabs or slots, or other securing mechanism may be used to secure the two halves together. As best shown in FIG. 2C near the rostral end 41, the sagittal band area may be reinforced with thicker or wider band sections or a solid portion to accommodate a fastening mechanism. Alternatively, the latch may be located at a rostral end or simply at the ventral side of the neck, relying on the size of the neck relative to the base of the skull to secure the device.

While right and left halves that part along a sagittal plane are depicted in FIGS. 1 and 2, it will be understood that the halves may also part along a transverse plane, producing top and bottom halves instead of right and left halves. In the case of transverse plane top and bottom halves, the hinge and fastener are located on opposite lateral sides of the headgear, and the headgear is brought near to the animal's head from the side containing the hinge.

Figure 5B:
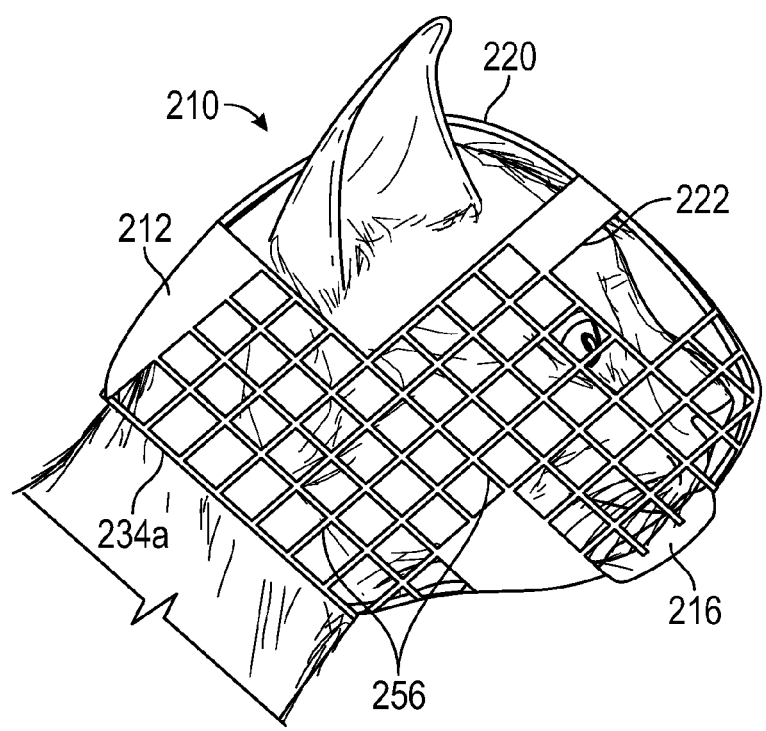
Figure 6:
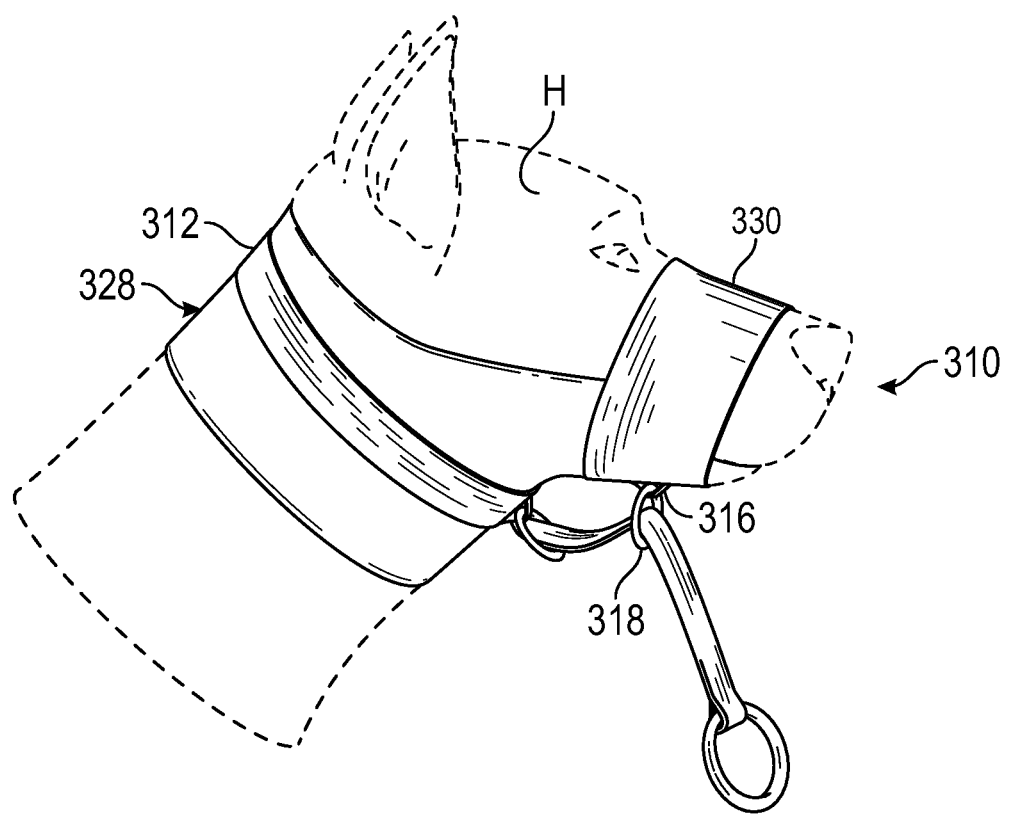
FIG. 6 illustrates a different embodiment of the clamshell headgear, showing some features adapted for dog.

FIGS. 5A and 5B show an alternative embodiments of the headgear 110, 210 in a closed position about the head H of an animal such as a cat. The hinge area 112 lies at a caudal position. In the embodiment of FIG. 5A, and there are openings 120, 122 and 124 to allow access to the animal's ears, eyes and nose/mouth, respectively. These openings allow a handler access for examining, treating, feeding, dosing medication or other necessary activity associated with the ears, eyes and nose/mouth of the animal. Recess 14a is shown for the animal's neck. In phantom, a variation is shown having an elongated neck or collar portion 128 if there is a need or desire to restrict flexion of the neck. Latch 116 is shown along the ventral side of the neck, although it could alternatively be anywhere under the chin area up to the rostral tip. A PSZ 40 for taste or smell sensations may be located between the eye opening 120 and the nose/mouth opening 124 at the rostral end.

The openings 122, 124 over the eyes and nose/mouth may be completely open, or they may have solid inserts (not shown) with air perforations for breathing and/or made of transparent material for sight, or opaque material if the animal tends to be calmed by less visual stimulation.

In the embodiment of FIG. 5B, the headgear 210 is of a mesh construction similar to the embodiment of FIGS. 2A-2C, and having recesses 234 to define a neck opening, a fastening latch mechanism 216, and web or band members such as 256. A PSZ may or may not be present. Although the animal shown in FIGS. 5A and 5B is a cat, this same type of headgear could also be used on a dog or other animal, with only minimal modifications to size the headgear to closely fit the animals head; for example elongating the headgear in a caudal-rostral dimension for a dog having a longer jaw and nose area, or adjusting the locations of ear and/or eye openings to be suitable for the dog or other animal.

FIG. 6 illustrates another embodiment of the headgear 310 in a closed position about the head H of a dog. The halves of the clamshell are again hinged at a caudal location 312. The neck or collar portion 328 is shown in a moderately extended position, but may extend even further if desired to minimize or prevent neck flexion as shown in phantom. There is little coronal aspect to this embodiment. The head and eyes are relatively free. However, there is a rostral portion 330 that is fairly lengthened in order to prevent bites. Latch 316 and leash attachment 318 are also shown in this embodiment.

In some embodiments, the headgear device can act as a base for attachment of novelty headgear such as reindeer ears, bunny ears, baseball caps, sun shades, rain gear, etc. It can also act as an attachment point for Halloween type masks and costumes. In some cases, the headgear, with or without other attachments can help promote wound healing by restricting the animal's ability to lick or bite at the wounded area. In this sense, it can act like the well-known "Elizabethan collar" restraints but is infinitely more comfortable and tolerable than the traditional cone of shame collars in present use.

In use, the headgear is easily placed about the pet's head and secured. In PSZ embodiments, the PSZ may be pre-loaded with an appropriate stimulus for the particular pet as discussed above. Alternatively, the headgear may be fitted first, and the stimulus is loaded into the headgear in situ.

The location of the hinge generally dictates the direction of approach to the pet. Since the fastener is on an opposite side as the hinge, the clamshell opening is with the latch and that side must be brought towards the pet first. This is why the caudal hinge location is a preferred embodiment—it allows the handler to fit the headgear posteriorly, from behind the pet. The handler then biases or presses the clamshell halves closed about the head. For sagittal plane (right and left halves) the bias is towards a medial direction to the mid-sagittal plane; while for coronal plane embodiments, the bias is from a ventral and dorsal extreme toward the midline. The biasing force is easily delivered by the handler's hands. Another advantage of the caudal hinge embodiment is that the hands and arms of the handler doing the biasing remain behind the animal, relatively safe from bites or scratches.

Once closed, the fastener of the headgear is secured, clamping the two halves together. The device allows restraint for such procedures as examination, venipuncture, pedicures, bathing, and grooming.

In other uses, the device is useful for socializing and training an animal. In some situations, and aggressor animal may need to be restrained to prevent it from harming another anima. Thus the invention includes a method to mitigate injury from interspecific and intraspecific interactions such as aggression between two dogs or two cats, or a cat and a dog. This can allow training and socialization in situations in which the aggressor could not be trusted with the non aggressor, or to prevent escalation of aggression between animals. A leading cause of death for dogs under the age of 3 is due to poor socialization which results in fear and associated aggression. A critical socialization period for dogs is between 3 weeks and 3 months of age. Animals not well socialized during this time can become more fearful and aggressive when they encounter new dogs, new people, unfamiliar situations that interfere with appropriate socialization later. The headgear can protect people and other animals during these interactions so that the animal can learn appropriate behavior. It can also mitigate dangerous behavior and allow the animal to coexist.

Other Features and Advantages

Construction:

The clamshell headgear material will be lightweight, durable, and somewhat flexible. It will also need to be fairly strong and tactile so that the handler has no issues manipulating or maneuvering the animal. A couple of potential materials are mesh wire coated in plastic, or a synthetic plastic that would be injection molded. An animal will react negatively towards the headgear if it is any way uncomfortable for them, so, along with custom sizing, this design is made from a lightweight material so it is almost weightless for the animal wearing it. Color: The color of this product can vary greatly. There will be different options for purchase such as a deluxe model and a standard model. In the deluxe model there could be any color produced and for the standard they may only be a few colors offered.

Custom Sizing and Fit:

Not every animal will have the same size or shape of the head. The "clamshell" headgear will come in a variety of sizes and offer a superior fit than any other product on the market. This custom sizing ensures that the headgear will not be removed during use and will be comfortable for the animal. In some embodiments, inside of the headgear there is optionally another layer of security and comfort added. A soft wrap or padding may be employed in animals needing only limited restriction. By utilizing technology similar to that of an air cast one can reproduce a "hug" effect on the animal. This serves to reduce stress and calms the animal, making the restraint more acceptable, which is important for fractious animals and reduces the need for repeated sedations.

Enhancements Useful for Medical or Veterinary Uses:

Ear, Mouth, and Eye Access:

The headgear preferably has openings for access to the ears, eyes, and the mouth. This is extremely important in veterinary and veterinary dental settings where the animal may need to have routine examinations and/or medicine applied to these areas. Use of the device facilitates and aids in administration of oral treatments and medications; dental treatment and medications; ophthalmic treatments and medications; and ear treatments and medications. Grips: Properly positioned grips are preferably built-in to the headgear to allow for safe manipulation of the animal's head without risk of injury. This is especially important for medical treatment caregivers, when blood needs to be drawn from the animal. Ear clamp: The implementation of an ear clamp will serve two main purposes. The first is to secure the ear during procedures and examinations, and the second is to get a pulse rate from the animal to know when dangerous levels are being approached. This is added security for the handler and the patient. Plastic Cover: A plastic cover or "overshell" that goes around the "clamshell" headgear will be developed as well so once the headgear is applied, the animal can be isolated within it. This case can serve as an oxygen mask and also a way of anesthetizing the patient. Oral speculum: An oral speculum is another feature that could be added to the headgear. This speculum would hold the mouth open during examinations and procedures reducing the risk of a bite. Fixation and venipuncture: A feature of the headgear is that it allows the head and neck area to be immobilized, particularly if the neck collar extension 128 is employed. This may be useful in treating neck injuries. In addition, with or without the collar extension, a jugular venipuncture is more easily accomplished to draw blood samples if the head and neck are immobilized through use of the headgear device. Sensors & Indicators: The headgear may be fitted with sensors and indicators that provide useful information about the animal's biological or physiologic status. It may include lights that vary in color or number (e.g. red, yellow, green) to indicate dangerous or safe conditions. Such sensors may also be useful in a positive reinforcement feedback loop that operates to release the pleasant stimulus in response to sensors that detect a calm and relaxed physiologic state, so as to reinforce this desired behavior. This feature is particularly useful for training purposes.

Pleasant Sensory Zone

As noted above, a key aspect of the invention is the pleasant sensory zone (PSZ) or module that is designed specially to appease the pet and reduce the anxiety and stress caused by strange handlers, strange environments, and foreign smells sounds and sights, and strange, unusual and sometimes uncomfortable manipulations or procedures. The PSZ is designed to pleasurably stimulate any of the pet's senses, specifically one or more of the senses of: vision/sight, olfactory/smell, auditory/sound, taste, and tactile/touch. The PSZ may be incorporated as a module or portion of the headgear that facilitates the delivery of a pleasant sensory stimulus to the proper area of the pet receptors for receiving that stimulus. For example, as discussed below, pheromones or flavors might be includes in a PSZ near the pet's nostrils at a rostral end of the headgear. Similarly, a tactile PSZ might be included along a portion of the headgear adjacent a ventral neck or chin area or a dorsal nape of the neck area; while an auditory stimulus would be included near the ear(s).

Flavor Port:

A flavor port located at a rostral portion near the mouth would provide a host of benefits for the handler. This allows for easy distraction of the animal during procedures, helps habituate them to the headgear through positive reinforcement, and reduces stress. For dogs, this might include peanut butter, bacon or other treat. For cats, tuna, catnip or chicken might be preferred. This port may stimulate gustatory receptors, olfactory receptors, or both. A specific embodiment of a flavor port type of PSZ 40 is illustrated in cross-section in FIG. 2D. In the clamshell portion near the rostral aspect, the wall 60 forms an opening 62 through which a wafer or disk 64 of candy or other treat may be exposed and smelled or licked by the animal. Extension wall 66 extends outwardly and around the disk or wafer 64 to form a pocket between the wall 60 and extension wall 66. At one end or top of the pocket an extension wall may be eliminated to allow the handler to slide the wafer or disk 66 into the pocket from outside the headgear to provide the stimulus for the animal. Flanges 68 of wall 60 extend beyond the limit of extension walls 66 to hold the wafer or disk 64 in the pocket so it cannot immediately be eaten by the animal.

An alternative flavor port takes the form of a treat dispenser that, upon activation, dispenses a candy or other treat though an opening into the cavity 13 for the animal to eat. The PEZ candy dispenser loaded with animal treats is a suitable mechanism that could be used in for this type of flavor port.

Pheromone Infused:

To help make the headgear more attractive for the animal the use of pheromones could be applied as an olfactory stimulus. By infusing the headgear with specific pheromones in a PSZ area near the nostrils, it will reduce the stress levels for the animal, and have a calming effect. The pet may actually learn to enjoy wearing the device, and it may in turn be used more frequently and with ease. Olfactory stimuli such as pheromones could be delivered using a pocket-like structure described above having a scent infused wafer, but having a perforated barrier in wall 60 rather than a complete opening. This would allow the scent to permeate the perforated barrier while preventing the animal from eating the wafer.

Auditory Stimuli:

Pleasing sounds, such as "white noise" generators may have a calming effect. Obviously, these PSZs would be located near an ear area of the headgear. Miniature speakers driven by onboard integrated chips and battery power could provide this stimulus. Music might be stored in the chip or preferably communicated to the chip wirelessly from a phone or tablet or computer by using, for example, Bluetooth technology and paring the devices.

Tactile Stimuli:

A tactile sensation may be provided by means of finger-like protrusions that "scratch" the pet in key places like under the chin or the neck. Another tactile stimuli might be bumps or ridges that apply pressure to key points on the animal. Such pressure points may include the carotid body to perform a vagal maneuver to slow the heart rate and calm the animal. Other useful pressure points are known to those versed in acupressure techniques.

Visual Stimuli:

In some animals, it is calming to "blind" them visual stimuli. In such cases, an opaque cover over an eye opening may have a pleasant and calming effect as a PSZ.

The foregoing description of the various aspects and embodiments of the present invention has been presented for purposes of illustration and description. It is not intended to be exhaustive of all embodiments or to limit the invention to the specific aspects disclosed. Obvious modifications or variations are possible in light of the above teachings and such modifications and variations may well fall within the scope of the invention as determined by the appended claims when interpreted in accordance with the breadth to which they are fairly, legally and equitably entitled.

What is claimed is:

1. A headgear for an animal, the headgear comprising:
  a pair of half clamshell portions each having periphery complementary to the other, and a cup-like concavity adapted collectively to fit about the head of an animal, the periphery defining a rostral end and a caudal end relative to the animal, the pair of half portions being connected at least one point along the periphery of the clamshell portions to form a flexible hinge joint; and
  a fastener mechanism positioned at the periphery opposing the flexible hinge joint and adapted for securing the clamshell portions together;

wherein the flexible hinge joint is located at the caudal end and the fastener is located at the rostral end to enable fitting the headgear to the animal from a posterior direction.

2. The headgear of claim 1 wherein the clamshell portions are sized and shaped to fit closely about the head of the animal.

3. The headgear of claim 2, wherein each clamshell portion defines an opening through which the ears of the animal may protrude and, optionally, an opening through which the eyes may see.

4. The headgear of claim 1, wherein the clamshell portion comprises a solid, transparent material.

5. The headgear of claim 1, wherein the clamshell portion comprises a mesh material.

6. The headgear of claim 1, wherein the fastener is selected from a quick release buckle, a snap, a hook-and-loop fastener.

7. The headgear of claim 6, wherein the clamshell opens laterally from a sagittal plane relative to an animal.

8. The headgear of claim 1, further comprising a pleasant sensory zone disposed in the headgear to deliver a pleasant stimulus to the animal while wearing the headgear.

9. The headgear of claim 8, wherein pleasant sensory zone is loaded with a stimulus selected from a pheromone, a flavoring agent, and a pet treat.

10. The headgear of claim 8, wherein the headgear has padding to enable comfortable continuous wearing.

11. The headgear of claim 1, further comprising one or more of:

handles or grips fabricated into the headgear, for holding the animal still;

attachment points for a leash; and sensors with indicia of the animal's biological condition or physiologic state.

12. A headgear for an animal, the headgear comprising:

a pair of half clamshell portions each having periphery complementary to the other, and a cup-like concavity adapted collectively to fit about the head of an animal, the periphery defining a rostral end and a caudal end relative to the animal, the pair of half portions being connected at least one point along the periphery of the clamshell portions to form a flexible hinge joint; and a fastener mechanism positioned at the periphery opposite the flexible hinge joint and adapted for securing the clamshell portions together;

wherein the clamshell portions are sized and shaped to fit closely about the head of the animal, and each clamshell portion defines an opening through which the ears of the animal may protrude and, optionally, an opening through which the eyes may see.

13. The headgear of claim 12, wherein the flexible hinge joint is located at the caudal end and the fastener is located at the rostral end to enable fitting the headgear to the animal from a posterior direction.

14. The headgear of claim 12, further comprising a pleasant sensory zone disposed in the headgear to deliver a pleasant stimulus to the animal while wearing the headgear.

* * * * *